J. D. Delap,

Corn Planter.

No. 113747.  Patented Apr. 18, 1871.

J. Dyson Delap
Inventor.

Witnesses.
H. D. Woods
Silas C. Delap

UNITED STATES PATENT OFFICE.

J. DYSON DELAP, OF TYRONE TOWNSHIP, PENNSYLVANIA.

IMPROVEMENT IN CORN-PLANTERS.

Specification forming part of Letters Patent No. 113,747, dated April 18, 1871.

*To all whom it may concern:*

Be it known that I, J. DYSON DELAP, of Tyrone township, in the county of Adams and State of Pennsylvania, have invented a new and useful Improvement in Machines for Planting Corn; and I do hereby declare that the following is a full, clear, and exact description of the construction and operation of the same, reference being made to the accompanying drawing, making a part of this specification, in which—

Figure 1:
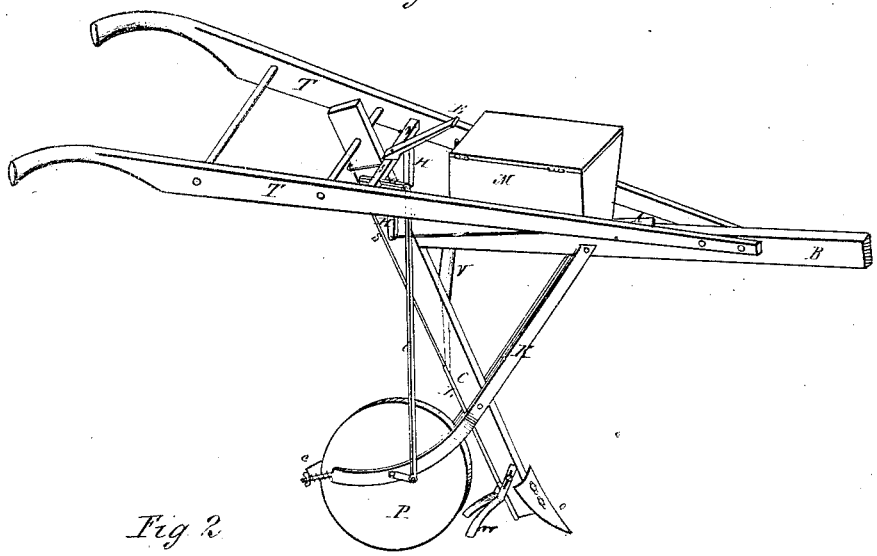
Figure 2:
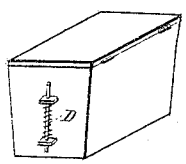
Figure 3:
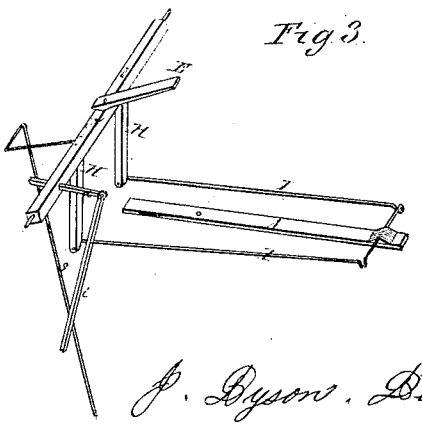

Figure 1 is a perspective view of the machine; Fig. 2, a similar view of the seed-box with its spring attachment; and Fig. 3 represents, in perspective, the mechanism for operating the seed-slide.

My invention consists in a rod arranged to reciprocate within the seed-discharging tube for the purpose of causing the seed to be delivered in the furrow with uniformity; also, in a seed-slide arranged to reciprocate in the bottom of the seed-box, and provided with an aperture in which the seed lodges, and from which it is delivered by a spring-rod operated by a tappet-arm on an oscillating bar which derives motion from the covering-roller; also, in the general combination of parts, as hereinafter specified.

In the drawing, B represents the beam, C the standard, and T the handles, of my improved corn-planter.

K is a brace connecting the beam and standard, and is forked at its lower end to form bearings for a covering-roller, P, whose periphery is scraped by a spring-plate, e, and whose revolution imparts a reciprocating movement to the seed-slide A (at the bottom of the seed-box M) through the medium of the oscillating bar N, radial arms H H, and connecting-rods I I and i.

A circular perforation is made in the seed-slide A, which becomes filled with grain while the slide is within the seed-box, and when withdrawn from the same the seed falls into a tube, V, which conducts it into a tube, L, attached to the rear side of the standard C, by which it is delivered in the furrow behind the shovel o.

A brush is employed in the seed-box in the usual way to prevent the escape of more than the requisite quantity of seed.

Since the seed is liable to stick in the aperture of the seed-slide, I have provided a spring-rod, D, working in lugs on the rear end of the seed-box, for pushing out the seed, which operation is effected by the arm E of the bar N striking the upper end of the spring-rod at each revolution of the roller P.

To prevent obstruction of the discharge of seed through the tube L the rod s is connected with the beam N by a radial arm, so that when said beam is oscillated the rod shall reciprocate in the tube.

In certain conditions of the soil it is not necessary to plant the seed so deep as at other times. Hence I have provided the shovel o and the covering-wings w with slots, which permit their vertical adjustment by means of the screw-bolts, whereby they are secured to the standard.

When the machine is drawn along the plow o opens a furrow, into which the seed drops from the tube L at suitable intervals of space, the wings w push or throw the earth back into the furrow upon the seed, and the roller P smooths and presses down the ridge thus formed.

Having thus described my invention, what I claim as new, and desire to secure by Letters Patent, is—

1. The combination of the rod s, bar N, roller P, connecting-rod i, and tube L, as and for the purpose specified.

2. The combination of the roller P, connecting-rod i, bar N, arm E, spring-rod D, seed-slide A, connecting-rods I I, and arms H H, as and for the purpose specified.

3. The combination of the seed-slide A, connecting-rods I, arms H, bar N, arm E, spring-rod D, rod s, tubes V and L, rod i, roller P, shovel o, and covering-wings w, as and for the purpose specified.

J. DYSON DELAP.

Witnesses:
J. C. PITTENTURF,
S. C. DELAP.